Nov. 20, 1962  C. C. STANTON  3,065,000
PIPE COUPLING FOR CONNECTING PIPE SECTIONS OF DIVERSE SIZE
Filed Aug. 5, 1959
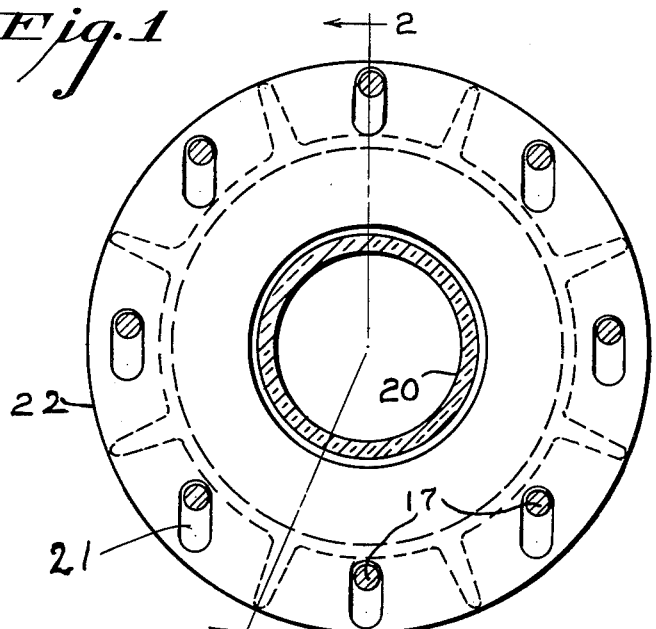
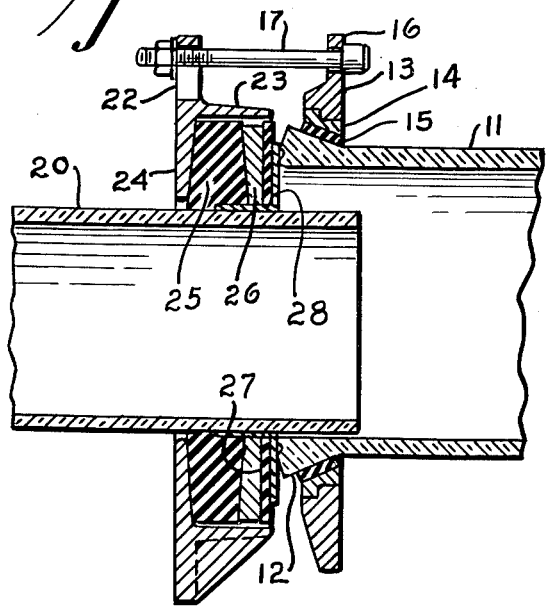
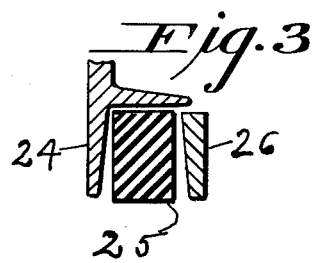
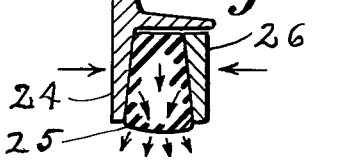
INVENTOR.
COURTLAND C. STANTON
BY Clarence R. Patty, Jr.
ATTORNEY United States Patent Office 3,065,000
Patented Nov. 20, 1962

3,065,000
PIPE COUPLING FOR CONNECTING PIPE SECTIONS OF DIVERSE SIZE
Courtland C. Stanton, Corning, N.Y., assignor to Corning Glass Works, Corning, N.Y., a corporation of New York
Filed Aug. 5, 1959, Ser. No. 831,794
2 Claims. (Cl. 285—177)

The present invention relates to pipe couplings and particularly to the provision of a coupling suitable for use in joining two pieces of pipe to one another wherein the outside diameter of one pipe is less than the bore diameter of the other and may have a plain end, whereas the end of the pipe to be coupled thereto has an external surface which flares outwardly toward its end.

According to the invention the flared end of the one pipe is compression sealed between the flange of a tubular gasket, closely surrounding the unflanged pipe, through the medium of a flange sealing gasket placed under compression by the clamping rings through the medium of a washer shaped follower. At the same time a compression gasket arranged between the clamping ring surrounding the smaller pipe and the washer shaped follower is compressed therebetween. The wall of such compression gasket is originally rectangular in cross section, but the surface of the clamping ring and the follower between which the gasket is compressed are such as to cause the gasket to become wedge-shaped with its thickest region adjacent the surrounded pipe. The gasket is thus caused to flow toward the pipe and exert a tremendous sealing and gripping force evenly around it as the clamping rings are drawn toward one another, effectively bringing the tubular wall of the flanged gasket in frictional engagement and sealing relation with the surrounded wall of the smaller pipe. Also, according to the invention the gasketing between the two pipes is such that the pipes need not be in axial alignment.

For a better understanding of the invention reference is now made to the accompanying drawing in which:

FIG. 1 is an end elevation of a coupling embodying the invention showing a pipe surrounded thereby in section.

FIG. 2 is an axial section through two pieces of pipe connected to one another by a coupling embodying the invention.

FIG. 3 is a sectional view of a compression gasket of the coupling, before compression, arranged between a clamping ring and a gasket follower of the coupling.

FIG. 4 is a representation, similar to FIG. 3, illustrating, by means of arrows, the direction of flow of the gasket as it is being compressed.

Referring to the drawing in detail, the numeral 11 designates a piece of pipe having the end of its wall thickened in such a manner that it is externally flared outwardly to form a seat 12 for a clamping ring 13 which may embody a back-up ring 14 and a cushion 15. Clamping ring 13 has the usual outwardly extending portion 16 perforated to accommodate suitable clamping bolts such as bolt 17.

The numeral 20 designates a plain piece of pipe whose end is telescoped into the larger pipe to be coupled thereto. Surrounding pipe 20 is a clamping ring embodying the usual clamping bolt receiving portion 22 surrounding a tubular portion 23 having an inwardly extending flange 24 whose surface that faces the pipe ends is slightly conical and slants in a direction away from such ends as it approaches the pipe.

Arranged in the annular space bordered on two sides by the tubular and flange portions 23 and 24 of the clamping ring and on the remaining two sides by the pipe 20 and the thickened end of pipe 11 are a compression gasket 25, a gasket follower 26, a disc-like compression gasket 27 and an outwardly flanged tubular sealing gasket 28. As will be noted the surface of the gasket follower 26 next to the compression gasket 25 is also slightly conical and therefore slants in a direction to aid clamping ring flange 24 in forcing the compression gasket 25 to flow toward the pipe 20 and about the tubular sealing gasket 28 as the clamping rings are drawn toward one another.

As can be comprehended from FIG. 4, as gasket 25 is compressed it is caused to flow toward and about the pipe 20 and about the tubular portion of gasket 28 thereby tightly gripping the pipe while establishing a seal between it and such gasket.

Attention is directed to the fact that portion 22 of the clamping ring has elongated bolt holes 21 that are parallel to one another thereby enabling the pipe 20 and its surrounding coupling to be shifted to compensate for any misalignment of the pipes 11 and 20 without adversely effecting the seal between the end of pipe 11 and the flange of sealing gasket 28, as in the illustration in FIG. 2.

What is claimed is:
1. A coupling between two pipes one of which is telescoped into the other, said coupling including a flanged tubular sealing gasket whose tubular portion closely surrounds the smaller of the pipes and whose flange is in intimate contact with the wall end of the larger pipe, annular compression gaskets each of rectangular cross section configuration backing up the tubular and flange portions respectively of said flanged tubular gasket, an annular gasket follower and the wall end of the one pipe between which one of the compression gaskets and the flange of the tubular gasket are arranged, said gasket follower being wedge shaped in cross section with the thicker portion remote from its bore, and means for sealing such pipes in telescopic relation which includes a tubular clamp having an inward extending flange between which and the gasket follower the other compression gasket is arranged, said inwardly extending flange face having a slope corresponding to that of the oppositely disposed surface of said gasket follower but oppositely disposed with respect thereto.

2. A coupling between two pipes of widely differing diameter, one of which is telescoped into the other, a gasket coupling said pipes in sealing relation having a tubular portion closely surrounding the smaller of said pipes and having an outwardly extending flange portion abutted against the end of the larger of said pipes, an annular gasket surrounding the smaller of said pipes and a part of the tubular portion of the flanged gasket, a disc-like gasket surrounding the tubular portion of said flanged gasket and abutted against its flange portion, a gasket follower wedge shaped in cross section whose thickest region is most remote from its bore interposed between the annular gasket and the disc-like gasket, and means comprising a tubular member surrounding the smaller of said pipes having an inwardly extending flange for compressing the annular gasket against said follower and having a gasket engaging surface similar to that of such follower but sloped in the opposite direction to impress such annular gasket about the tubular portion of the flanged gasket and about the circumference of the smaller of said pipes and for at the same time compressing the disc-like gasket and the flange portion of the flanged gasket between said follower and the end of the larger of said pipes.

References Cited in the file of this patent

UNITED STATES PATENTS

| | | |
|---|---|---|
| 377,776 | Putnam | Feb. 14, 1888 |
| 494,402 | Walsh | Mar. 28, 1893 |
| 689,624 | Ryan | Dec. 24, 1901 |
| 931,171 | Williams | Aug. 17, 1909 |
| 979,652 | Church | Dec. 27, 1910 |
| 1,039,488 | Clark | Sept. 24, 1912 |
| 1,153,942 | Mills | Sept. 21, 1915 |
| 1,632,042 | Price | June 14, 1927 |
| 2,059,775 | Clark | Nov. 3, 1936 |
| 2,205,910 | Raybould | June 25, 1940 |
| 2,334,663 | Whitney | Nov. 16, 1943 |
| 2,606,574 | Lefebure | Aug. 12, 1952 |

FOREIGN PATENTS

| | | |
|---|---|---|
| 24,419 | Great Britain | Oct. 25, 1909 |
| 809,441 | France | Dec. 12, 1936 |
| 837,028 | Germany | Apr. 17, 1952 |
| 1,179,405 | France | Dec. 22, 1958 |